United States Patent
Procopio (10) Patent No.: US 9,633,081 B1
(45) Date of Patent: Apr. 25, 2017

(54) SYSTEMS AND METHODS FOR DETERMINING APPLICATION INSTALLATION LIKELIHOOD BASED ON USER NETWORK CHARACTERISTICS

(71) Applicant: Google Inc., Mountain View, CA (US)

(72) Inventor: Michael Jeffrey Procopio, Boulder, CO (US)

(73) Assignee: Google Inc., Mountain View, CA (US)

( * ) Notice: Subject to any disclaimer, the term of this patent is extended or adjusted under 35 U.S.C. 154(b) by 242 days.

(21) Appl. No.: 14/040,780

(22) Filed: Sep. 30, 2013

(51) Int. Cl.
*G06F 17/30* (2006.01)

(52) U.S. Cl.
CPC ................................. *G06F 17/3053* (2013.01)

(58) Field of Classification Search
None
See application file for complete search history.

(56) References Cited

U.S. PATENT DOCUMENTS

| | | | |
|---|---|---|---|
| 7,617,519 B2 | 11/2009 | Williams | |
| 8,452,797 B1 | 5/2013 | Paleja et al. | |
| 8,468,164 B1 | 6/2013 | Paleja et al. | |
| 8,612,470 B1 | 12/2013 | Fushman et al. | |
| 9,058,612 B2 | 6/2015 | Ben-Itzhak | |
| 9,207,973 B2 * | 12/2015 | Clark | G06F 9/461 |
| 2004/0155901 A1 * | 8/2004 | McKee | G06F 9/44505 |
| | | | 715/747 |
| 2006/0136389 A1 | 6/2006 | Cover et al. | |
| 2007/0060099 A1 | 3/2007 | Ramer et al. | |
| 2007/0203872 A1 * | 8/2007 | Flinn | G06N 5/048 |
| | | | 706/62 |
| 2009/0006398 A1 | 1/2009 | Lam et al. | |

(Continued)

FOREIGN PATENT DOCUMENTS

| | | | |
|---|---|---|---|
| CN | WO 2014036936 A1 * | 3/2014 | G06F 8/65 |
| KR | 2003-0016494 | 3/2003 | |
| WO | WO 2013/062546 | 5/2013 | |

OTHER PUBLICATIONS

Su, Xiaoyuan and Khoshgoftaar, Taghi M., "A Survey of Collaboartive Filtering Techniques," Advances in Artificial Intelligence, vol. 2009, Article ID 421425.*

(Continued)

*Primary Examiner* — James Trujillo
*Assistant Examiner* — Aida Tessema
(74) *Attorney, Agent, or Firm* — Ropes & Gray LLP (57) ABSTRACT

A method for providing a scored list of applications for use in recommending applications to a user includes storing an application signature for each user of a cloud computing service, where the application signature for a first user stores a usage total for the first user for each application in a set of available applications, and storing a user similarity matrix across all users, where a first similarity value in the user similarity matrix measures the similarity between the first user's application signature and a second user's application signature. The cloud computing service receives a request to provide a scored list of applications for the first user, constructs the scored list, where a score of each application is a function of the usage totals for the application in the application signatures for each user and each user's similarity value to the first user, and outputs the scored list of applications.

32 Claims, 7 Drawing Sheets

(56) References Cited

U.S. PATENT DOCUMENTS

| | | | |
|---|---|---|---|
| 2009/0089119 A1* | 4/2009 | Ranjan | G06Q 30/02 705/7.13 |
| 2009/0106314 A1 | 4/2009 | Song et al. | |
| 2009/0259998 A1 | 10/2009 | Bergman et al. | |
| 2010/0042608 A1 | 2/2010 | Kane | |
| 2010/0094878 A1 | 4/2010 | Soroca et al. | |
| 2010/0250337 A1 | 9/2010 | Kassaei | |
| 2011/0028138 A1* | 2/2011 | Davies-Moore | G06F 3/04817 455/418 |
| 2011/0153853 A1 | 6/2011 | London et al. | |
| 2011/0307354 A1 | 12/2011 | Erman et al. | |
| 2012/0072283 A1 | 3/2012 | DeVore et al. | |
| 2012/0084292 A1 | 4/2012 | Liang et al. | |
| 2012/0096435 A1 | 4/2012 | Manolescu et al. | |
| 2012/0179973 A1 | 7/2012 | Brolley et al. | |
| 2012/0215684 A1 | 8/2012 | Kidron | |
| 2012/0297038 A1* | 11/2012 | Mei | G06Q 50/01 709/223 |
| 2012/0303477 A1 | 11/2012 | Ben-Itzhak | |
| 2013/0086553 A1* | 4/2013 | Grechanik | G06F 8/71 717/123 |
| 2013/0103758 A1 | 4/2013 | Alison et al. | |
| 2013/0132896 A1 | 5/2013 | Lee et al. | |
| 2013/0138674 A1 | 5/2013 | Jeong et al. | |
| 2013/0166357 A1 | 6/2013 | Eggs et al. | |
| 2013/0173637 A1 | 7/2013 | Kim et al. | |
| 2013/0185292 A1 | 7/2013 | Li et al. | |
| 2013/0185294 A1* | 7/2013 | Kami | G06Q 30/02 707/732 |
| 2013/0198029 A1 | 8/2013 | Mowatt et al. | |
| 2013/0198506 A1 | 8/2013 | Smith et al. | |
| 2013/0282750 A1* | 10/2013 | Paul | G06F 17/30675 707/767 |
| 2013/0311836 A1 | 11/2013 | Hurst et al. | |
| 2014/0157173 A1* | 6/2014 | Takayama | G06F 9/44505 715/771 |
| 2014/0222952 A1 | 8/2014 | Suryavanshi et al. | |
| 2014/0317031 A1 | 10/2014 | Babenko | |

OTHER PUBLICATIONS

IBM Knowledge Center—Administering the Widget Container http://www-01.ibm.com/support/knowledgecenter/SSYGQH_5.0.0/admin/admin/t_admin_common_widget_cocontain.dita?lang=en, retrieved Sep. 28, 2015, 2 pages.

IBM Knowledge Center—Managing images and videos for thumbnails and preview: http://www-01.ibm.com/support/knowledgecenter/api/content/nl/en-us/SSYGQH_5.0.0/admin/admin/t_admin_common_widget_container.dita, retrieved Sep. 28, 2015, 1 page.

MIME Types: http://www.sitepoint.com/web-foundations/mime-types-complete-list/, Apr. 15, 2014, 22 pages.

Office Action dated Nov. 4, 2016 in U.S. Appl. No. 14/040,775, (37 pages).

International Search Report and Written Opinion for Application No. PCT/US2014/053012 dated Nov. 27, 2014, 10 pages.

International Search Report and Written Opinion for Application No. PCT/US2014/053565 dated Dec. 2, 2014, 8 pages.

Han, et al., "Efficient Service Recommendation System for Cloud Computing Market", ICIS 2009, Nov. 24-26, 2009 pp. 839-845.

* cited by examiner

302
| File 1, User 1 | |
| --- | --- |
| App ID | Count |
| App A | 1000 |
| App B | 500 |
| App C | 0 |
| App D | 3000 |

304
| File 1, User 2 | |
| --- | --- |
| App ID | Count |
| App A | 2000 |
| App B | 500 |
| App C | 3000 |
| App D | 0 |

306
| File 1, User 3 | |
| --- | --- |
| App ID | Count |
| App A | 0 |
| App B | 500 |
| App C | 3000 |
| App D | 0 |

308
| File 2, User 1 | |
| --- | --- |
| App ID | Count |
| App A | 600 |
| App B | 400 |
| App C | 0 |
| App D | 2000 |

310
| File 2, User 2 | |
| --- | --- |
| App ID | Count |
| App A | 1000 |
| App B | 600 |
| App C | 2000 |
| App D | 0 |

312
| File 2, User 3 | |
| --- | --- |
| App ID | Count |
| App A | 0 |
| App B | 800 |
| App C | 1000 |
| App D | 0 |

| 402 | | 404 | | 406 | |
|---|---|---|---|---|---|
| User 1 App Signature | | User 2 App Signature | | User 3 App Signature | |
| App ID | Value | App ID | Value | App ID | Value |
| App A | 1600 | App A | 3000 | App A | 0 |
| App B | 900 | App B | 1100 | App B | 1300 |
| App C | 0 | App C | 5000 | App C | 4000 |
| App D | 6000 | App D | 0 | App D | 0 |

| | User 1 | User 2 | User 3 |
|---|---|---|---|
| User 1 | 1 | 0.155 | 0.04 |
| User 2 | --- | 1 | 0.89 |
| User 3 | --- | --- | 1 |

602
| User 1 – User 3 App Sig ||
|---|---|
| App ID | Value |
| App A | 1600 |
| App B | -400 |
| App C | -4000 |
| App D | 6000 |

604
| User 2 – User 3 App Sig ||
|---|---|
| App ID | Value |
| App A | 3000 |
| App B | -200 |
| App C | 1000 |
| App D | 0 |

| App ID | Score |
|---|---|
| App A | 2940 |
| App D | 258 |

SYSTEMS AND METHODS FOR DETERMINING APPLICATION INSTALLATION LIKELIHOOD BASED ON USER NETWORK CHARACTERISTICS

BACKGROUND

Cloud computing services provide users with the ability to store, access, edit, and share electronic files using any electronic device capable of connecting to the cloud computing service over a remote network, such as the Internet. The files are stored on the cloud computing service rather than the user's electronic devices. The cloud computing service provides a user interface, for example through a web browser, for users to access and view the files. The files stored on cloud computing services may include word processing documents, spreadsheet files, presentation files, picture files, audio files, video files, and a number of other open or proprietary file formats.

A cloud computing service may be able to open many of the files that it stores through its user interface. However, cloud computing services may not be configured to open, display, or edit certain types of files, especially for some proprietary or less common file types. Cloud computing services may instead offer third-party applications to the user, where the third-party applications may be used to open certain files stored on the cloud computing service, as well as perform other functions. Third-party developers work with the cloud computing service to make the applications available to the user. Users may select and install an application to use in conjunction with, or separately from the cloud computing service. Cloud computing services may offer a large number of applications to users. Users may be overwhelmed with choices and may not be aware of certain applications that they may find useful. In addition, users may find it difficult to select between several similar applications, and also may not have the time to install many applications and test each one to find applications that they like.

SUMMARY

The systems and methods described herein provide ways to recommend applications offered by a cloud computing service to a user, where the recommendation is based on comparing the application usage characteristics of the user to other users. The cloud computing service creates and stores an application signature for each user, where the application signature stores a usage total that represents the number of times the user has used each application provided by the cloud computing service. The cloud computing service also creates and stores a user similarity matrix, which stores a similarity value measuring the similarity of the application signature between any two users. The cloud computing service receives a request to provide a scored list of applications, where the scored list of applications is used to recommend applications to a user. The scored list of applications is constructed, where the score for each application is a function of the usage totals of the application stored in the application signatures for each user and the other users' similarity values to the user. The scored list of applications is then outputted.

One aspect described herein discloses a method for providing a scored list of applications for use in recommending applications to a user, which includes storing an application signature for each user of a cloud computing service, where the application signature for a first user stores a usage total for the first user for each application in a set of available applications provided by the cloud computing service. The method further includes storing a user similarity matrix across all users of the cloud computing service, where a first similarity value in the user similarity matrix measures the similarity between the first user's application signature and a second user's application signature. The method further includes receiving at the cloud computing service a request to provide a scored list of applications for the first user, constructing the scored list of applications from the set of available applications, where a score of each application is a function of the usage totals for the application in the application signatures for each user and each user's similarity value to the first user, and outputting the scored list of applications.

Another aspect described herein discloses an apparatus for providing a scored list of applications for use in recommending applications to a user, the apparatus including a server configured to communicate with a plurality of client computers, store an application signature for each user of the server, where the application signature for a first user stores a usage total for the first user for each application in a set of available applications provided by the server, and store a user similarity matrix across all users of the server, where a first similarity value in the user similarity matrix measures the similarity between the first user's application signature and a second user's application signature. The server is further configured to receive from a first client computer in the plurality of client computers a request to provide a scored list of applications for the first user, construct the scored list of applications from the set of available applications, where a score of each application is a function of the usage totals for the application in the application signatures for each user and each user's similarity value to the first user, and output the scored list of applications.

Another aspect described herein discloses a non-transitory computer readable medium storing computer-executable instructions, which, when executed by a processor, cause the processor to carry out a method for providing a scored list of applications for use in recommending applications to a user. The computer readable medium includes instructions to store an application signature for each user of a cloud computing service, where the application signature for a first user stores a usage total for the first user for each application in a set of available applications provided by the cloud computing service, and instructions to store a user similarity matrix across all users of the cloud computing service, where a first similarity value in the user similarity matrix measures the similarity between the first user's application signature and a second user's application signature. The computer readable medium further includes instructions to receive at the cloud computing service a request to provide a scored list of applications for the first user, instructions to construct the scored list of applications from the set of available applications, where a score of each application is a function of the usage totals for the application in the application signatures for each user and each user's similarity value to the first user, and instructions to output the scored list of applications.

Another aspect described herein discloses a system for providing a scored list of applications for use in recommending applications to a user, the system including a plurality of client computers and a server. The server is configured to communicate with the plurality of client computers, store an application signature for each user of the server, where the application signature for a first user stores a usage total for the first user for each application in a set of available applications provided by the server, and store a user similarity matrix across all users of the server, where a first similarity value in the user similarity matrix measures the similarity between the first user's application signature and a second user's application signature. The server is further configured to receive from a first client computer in the plurality of client computers a request to provide a scored list of applications for the first user, construct the scored list of applications from the set of available applications, where a score of each application is a function of the usage totals for the application in the application signatures for each user and each user's similarity value to the first user, and output the scored list of applications.

BRIEF DESCRIPTION OF THE DRAWINGS

The methods and systems may be better understood from the following illustrative description with reference to the following drawings in which.

DETAILED DESCRIPTION

To provide an overall understanding of the systems and methods described herein, certain illustrative embodiments will now be described. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server, service, or system as used in this description may be a single computing device or multiple computing devices working collectively and in which the storage of data and the execution of functions are spread out among the various computing devices.

Aspects of the systems and methods described herein relate to providing a way to recommend applications to a user, where the recommendation is based on comparing the application usage characteristics of the user to other users. The cloud computing service creates and stores an application signature for each user, where the application signature stores a usage total that represents the number of times the user has used each application provided by the cloud computing service. The cloud computing service also creates and stores a user similarity matrix, which stores a similarity value measuring the similarity of the application signature between any two users. The cloud computing service receives a request to provide a scored list of applications, where the scored list of applications is used to recommend applications to a user. The scored list of applications is constructed, where the score for each application is a function of the usage totals of the application stored in the application signatures for each user and the other users' similarity value to the user. The scored list of applications is then outputted.

Figure 1:
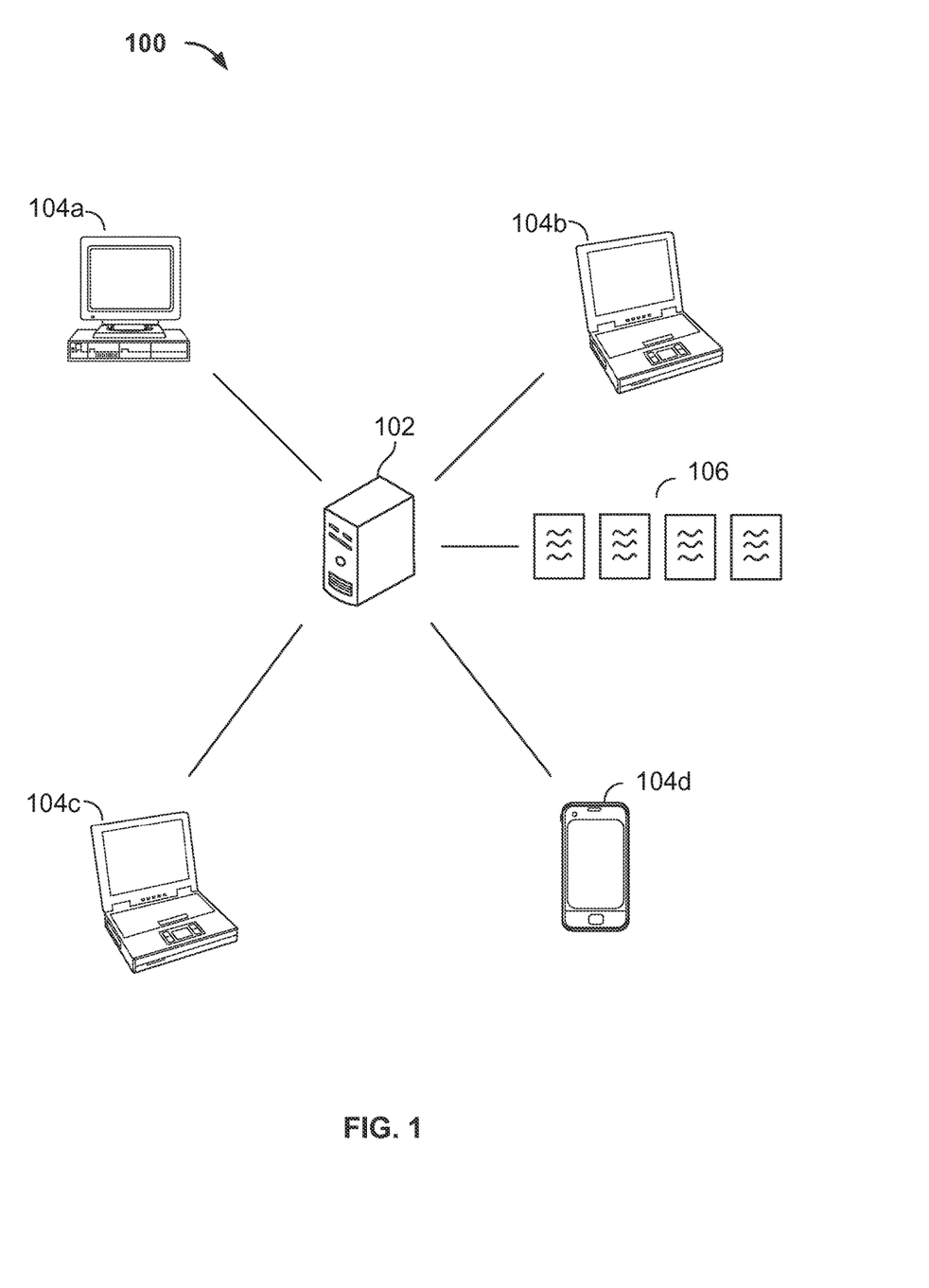
FIG. 1 shows a number of client computers in communication with a cloud computing service in accordance with an implementation as described herein.

First, a network system in which a number of client computers may connect to a cloud computing service is described. FIG. 1 shows a network system 100 that includes cloud computing service 102 and a number of client computers 104a through 104d. Cloud computing service 102 may include one or more servers that collectively provide cloud computing services for a number of client computers. Cloud computing service 102 stores a number of files accessible by client computers 104a-104d, such as files 106. Files 106 may include word processing documents, spreadsheets, presentations, images, audio files, video files, or any other files of various open or proprietary file types. Users may create, edit, copy, share, and delete files stored on cloud computing service 102. Client computers 104a-104d may include desktop computers, laptop computers, tablets, smart phones, mobile electronic devices, or any other device that may connect to cloud computing service 102 to view files 106. System 100 may include many additional client computers not pictured in FIG. 1. The network connection between the client computers 104a-104d and cloud computing service 102 in network system 100 may be facilitated through a local area network, wide area network, Ethernet, fiber optic network, or any other wired or wireless connection.

The components of a client computer and a cloud computing service in communication with each other are now described in more detail. System 200 in FIG. 2 includes a cloud computing service 202 in communication with a client computer 216. Cloud computing service 202 includes a central processing unit (CPU) 204, read-only memory (ROM) 206, random access memory (RAM) 208, communications unit 210, data store 212, and bus 214. Cloud computing service 202 may have additional components that are not illustrated in FIG. 2. Bus 214 allows the various components of cloud computing service 202 to communicate with each other. Communications unit 210 allows cloud computing service 202 to communicate with other devices, such as client computer 216 and other client computers. Data store 212 is used to store files accessible by a user on client computer 216. Users log on to the cloud computing service using a username and password, and cloud computing service 202 provides a user interface for the display of files through the web browsers executing on the client computers. Data store 212 may also store a number of applications that are made available to users for installation.

Figure 2:
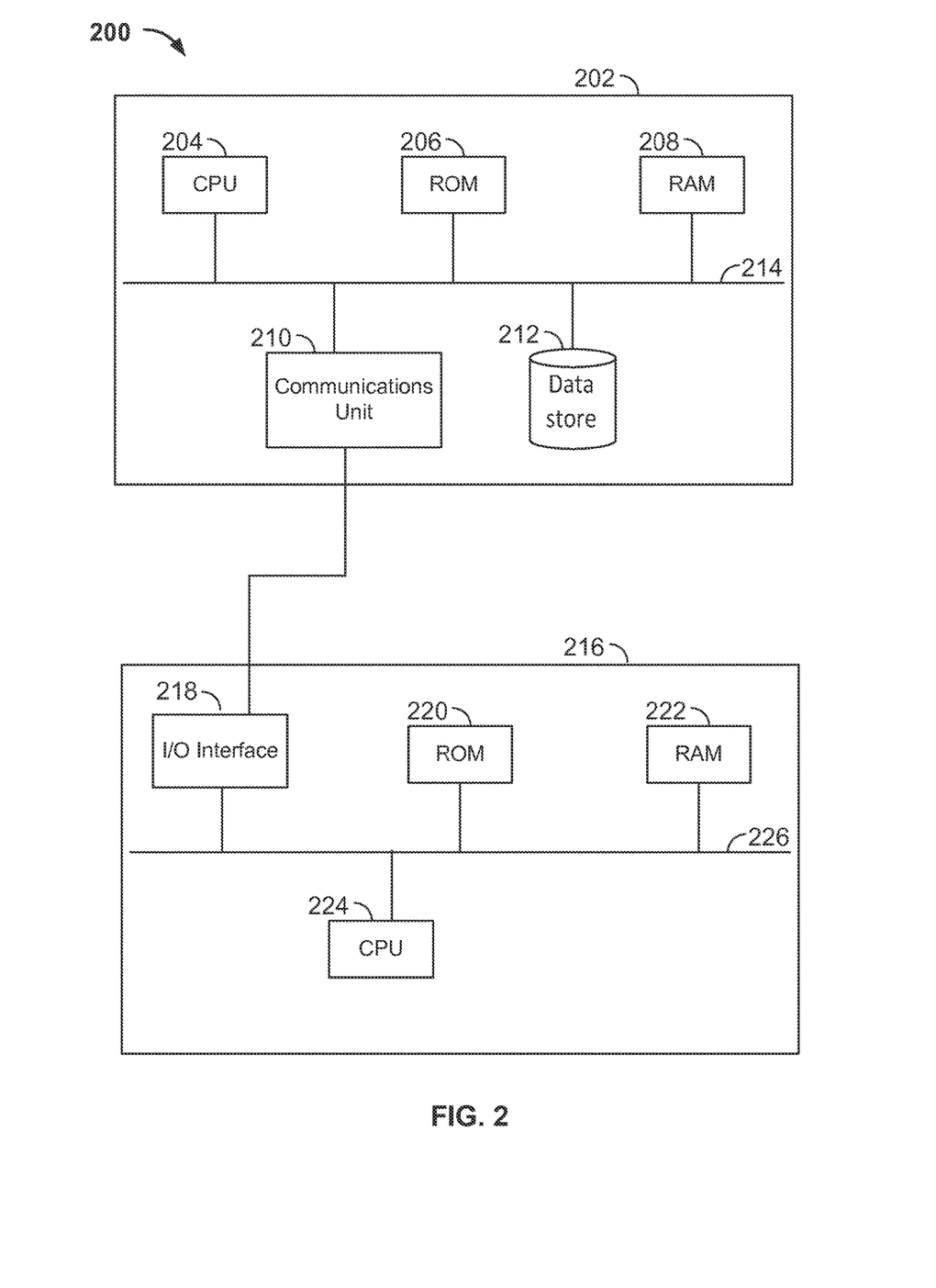
FIG. 2 shows the components of a cloud computing service in communication with a client computer in accordance with an implementation as described herein.

Data store 212 may also store metadata regarding files and users, and may store tables, matrices, files and other data structures based on the file and user metadata. The data structures may be used by cloud computing service 202 to create a scored list of applications for use in making application recommendations to users. These data structures may include user application signatures and a user similarity matrix, which are discussed further herein. The data structures may be updated or recalculated on a periodic basis by a data process scheduler executed by CPU 204. File and user metadata may be changed by recent user actions, so data structures based on the metadata are recalculated to account for those recent actions. CPU 204 may load some data structures to RAM 208, e.g. a data cache, while CPU 204 processes requests to provide a scored list of applications. The data cache allows CPU 204 to reference recently used data and is periodically refreshed.

Client computer 216 includes a CPU 224, ROM 220, RAM 222, input/output interface 218, and bus 226. Client computer 216 may have additional components that are not illustrated in FIG. 2. Bus 226 allows the various components of client computer 216 to communicate with each other. Input/output interface 218 allows client computer 216 to communicate with other devices, such as cloud computing service 202. Input/output interface 218 also includes devices for taking in user inputs and displaying outputs to a user, such as a keyboard, mouse, and display screen. CPU 224 executes various programs stored in memory on client computer 216, such as a web browser. Web browsers are used, among other things, to display a user interface provided by cloud computing service 202 for viewing and editing files. Web browsers receive web page documents encoded in HTML, CSS, or other web-compatible languages and interpret the language to properly display the web page.

Data store 212 for storing files, applications, and data structures on cloud computing service 202, a web browser executing on client computer 216, and other data structures and software programs in system 200 may be implemented using non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and read-only, once-writable, or rewriteable optical disks (such as, e.g., CDROM, CDR, CD+R, CDRW, CD+RW, DVDROM, DVDR, DVD+R, DVDRW, and DVD+RW).

A cloud computing service has a large base of users and available applications, and is capable of collecting aggregate data concerning the installation and usage of applications by users. This data is statistically significant and may be harnessed to generate application recommendations for a particular user. One type of information that a cloud computing service may use to recommend applications is the application usage behavior of each user. Each user uses a number of applications to open files stored on the cloud computing service. The cloud computing service may store application usage history for each user. Some users tend to be similar to other users in the applications that they use. The cloud computing service is able to determine application usage similarities between users and then recommend applications to a user that similar users have also used.

Figure 3:
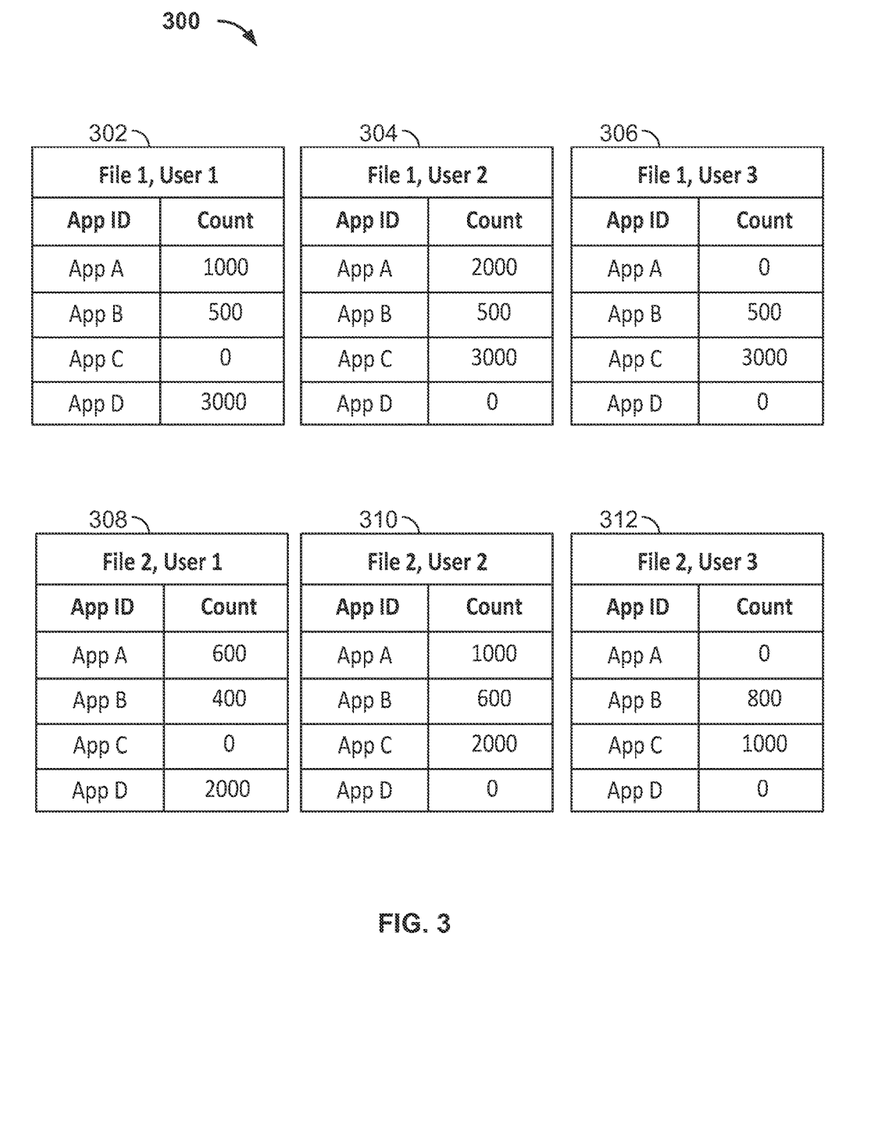
FIG. 3 shows an example of application usage history data by users of a cloud computing service in accordance with an implementation as described herein.

The cloud computing service stores metadata information about each user of the cloud computing service and each file stored on the cloud computing service. In particular, the cloud computing service stores application usage history data which counts how many times a user has used a specific application to open a specific file. FIG. 3 shows an example of application usage history data. The application usage history data is stored in the metadata of each file and are arranged on a per user basis. For example, table 302 stores the application usage table for User 1 and File 1. That is, table 302 stores how many times User 1 has used each application to open File 1. Every time User 1 uses an application to open File 1, the cloud computing service increments the appropriate entry in table 302 by one. For example, table 302 shows that User 1 has used App A to open File 1 1,000 times, has used App B to open File 1 500 times, has used App D to open File 1 3,000 times, and has never used App C to open File 1. Tables 302, 304, and 306 are the application usage history data for File 1 for User 1, User 2, and User 3 respectively, while tables 308, 310, and 312 are the application usage history data for File 2 for User 1, User 2, and User 3 respectively. The applications in the application usage history data may be denoted by an application ID. The application usage history tables may not record information about non-usage of applications, i.e. only non-zero entries appear in the tables. The cloud computing service periodically updates the application usage history data to account for recent user activity.

Figure 4:
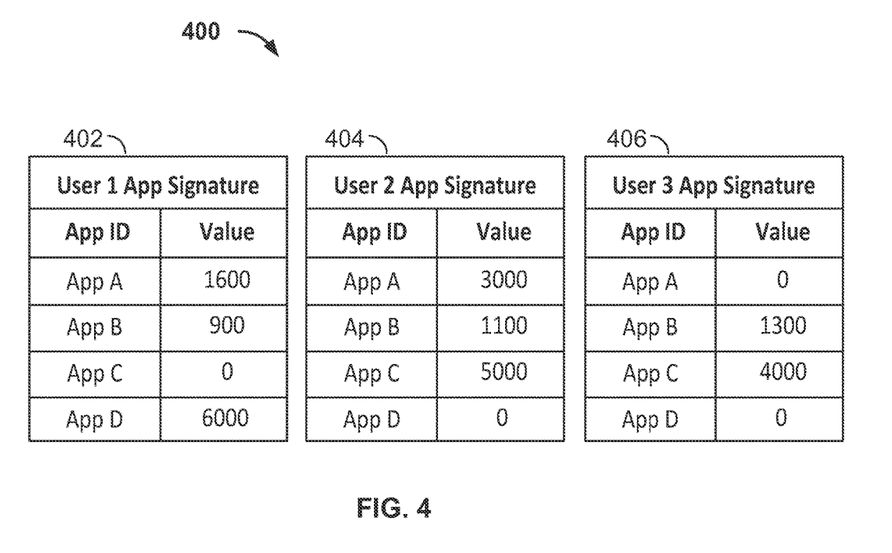
FIG. 4 shows an example of application signatures for users of a cloud computing service in accordance with an implementation as described herein.

The application usage history data may be used to create an application signature for each user, which represents the application usage behavior of each user across all files accessible to the user. FIG. 4 shows examples of application signatures 402, 404, and 406 for User 1, User 2, and User 3 respectively, where the application signatures are based on the application usage history data found in FIG. 3. Each application signature is a table of application IDs and a corresponding usage total. The usage total is a function of the number of times the user has used the application to open files stored on the cloud computing service. The usage total may be the sum of the number of times the user has used the application to open each file accessible to the user. For example, table 302 in FIG. 3 shows that User 1 used App A to open File 1 1,000 times, and table 308 shows that User 1 used App A to open File 2 600 times. If File 1 and File 2 are the only files on the cloud computing service that User 1 has opened, the usage total for App A in application signature 402 is 1,000+600=1,600. A similar calculation is made for the usage totals of App B, App C, and App D in application signature 402, and likewise for application signatures 404 and 406 for User 2 and User 3 respectively. The usage total for applications that a user has never used is 0. The cloud computing service stores and periodically updates the application signature for each user to account for recent user activity.

Figure 5:
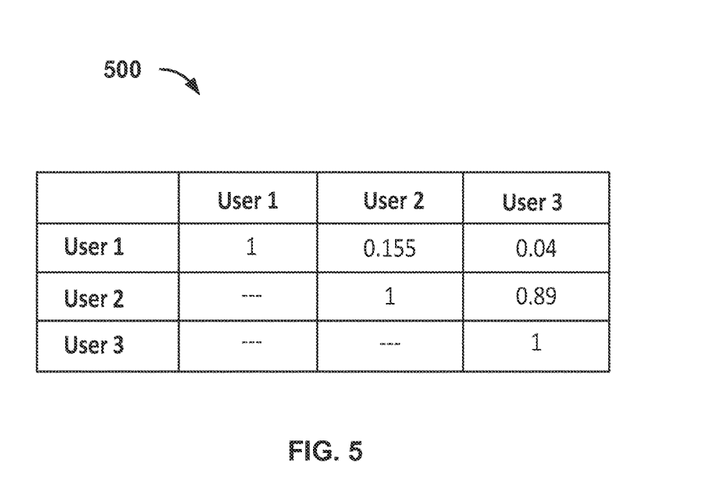
FIG. 5 shows an example of a user similarity matrix stored on a cloud computing service in accordance with an implementation as described herein.

The application signatures for each user may be used to compare the similarity between pairs of users with regard to application usage behavior. All possible pairs of users may be compared and a similarity value assigned to each pair of users. The cloud computing service creates and stores a pairwise user similarity matrix to hold the similarity values between pairs of users of the cloud computing service. FIG. 5 shows an example of a user similarity matrix 500 based on the application signatures shown in FIG. 4. The rows and columns of similarity matrix 500 both represent all the users of the cloud computing service, and may be indexed by user ID. Similarity matrix 500 is shown in FIG. 5 as an upper triangular matrix because the matrix is symmetric, i.e. entries appearing below the matrix diagonal also appear above the matrix diagonal. Similarity matrix 500 may also be constructed as a lower triangular matrix, or may be a complete square matrix. The cloud computing service periodically updates user similarity matrix 500 to account for up-to-date application signatures for each user based on recent user activity.

The similarity values of the cells in user similarity matrix 500 are a measure of the similarity of application usage between the user represented by the row and the user represented by the column. For example, the similarity value of each cell may range from 0 to 1, where 0 represents no similarity between users and 1 represents complete similarity between users. The entries in the diagonal of similarity matrix 500 are 1 because the user of the row and column are the same. The similarity value is calculated from the application signatures of two users. The application signatures may be considered vectors, where each application is considered a dimension and the usage total for that application is the magnitude of that dimension. There are a number of ways to quantify the similarity between vectors. One such method is called cosine similarity. The cosine similarity value between two vectors X and Y is the dot product of the vectors divided by the product of their magnitudes. It is expressed as $\cos(\theta)=X\bullet Y/\|X\|\|Y\|$, where $X\bullet Y$ is the dot product of vectors X and Y, $\|X\|$ is the magnitude of vector X, and $\|Y\|$ is the magnitude of vector Y. For example, in FIG. 4 application signature 402 for User 1 may be expressed as vector (1600, 900, 0, 6000) and application signature 404 for User 2 may be expressed as vector (3000, 1100, 5000, 0). The cosine similarity value $\cos(\theta)$ between these two vectors is 0.155, shown in similarity matrix 500. Other methods for calculating the similarity value may also be used to construct user similarity matrix 500, such as Euclidean distance, Manhattan distance, or Minkowski distance.

The application signatures and the user similarity matrix may be used to generate a score for each available application provided by the cloud computing service. A scored list of applications is used to recommend applications to a user. The score is based on differences between the application signature of the user and each other user, weighted by the similarity value of the user with each other user. A flow chart for calculating the scored list of applications for a target user is shown below:
1. For each of the N-1 other users of the cloud computing service (the "loop user"):
    a. Look up the similarity value between the loop user and the target user from the user similarity matrix.
    b. Look up the application signatures for the loop user and the target user.
    c. Subtract the application signature of the target user from the loop user, where the usage total of each application in the target user application signature is subtracted from the corresponding usage total of the application in the loop user application signature.
2. For each application where the target user's application signature usage total for that application is zero:
    d. Compute the weighted average of the (N-1) application signature differences, where the weights come from the similarity values between the target user and each of the (N-1) other users.
    e. Store the weighted average as the score for the application.

Figure 6:
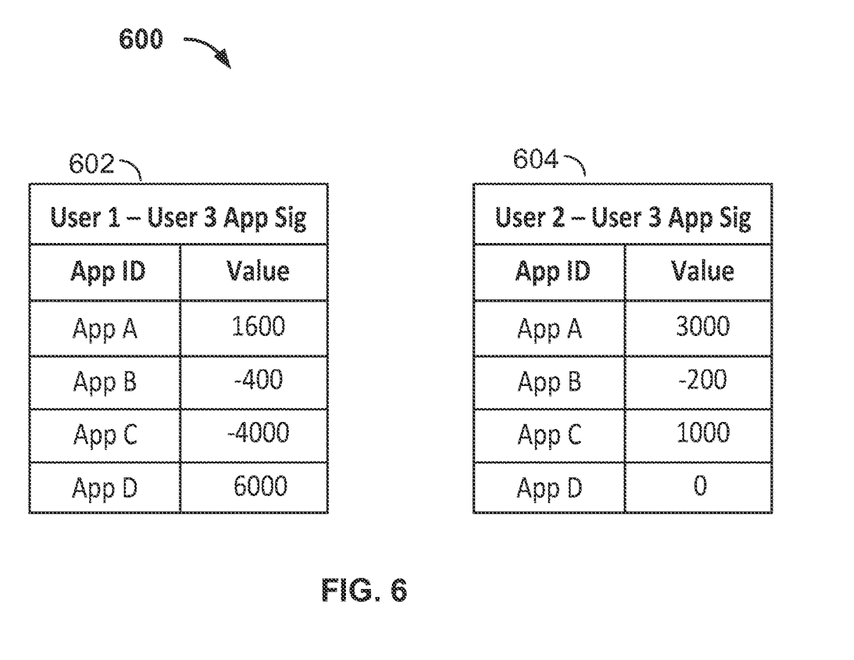
FIG. 6 shows an example of subtracting the application signatures of two users in accordance with an implementation as described herein.
Figure 7:
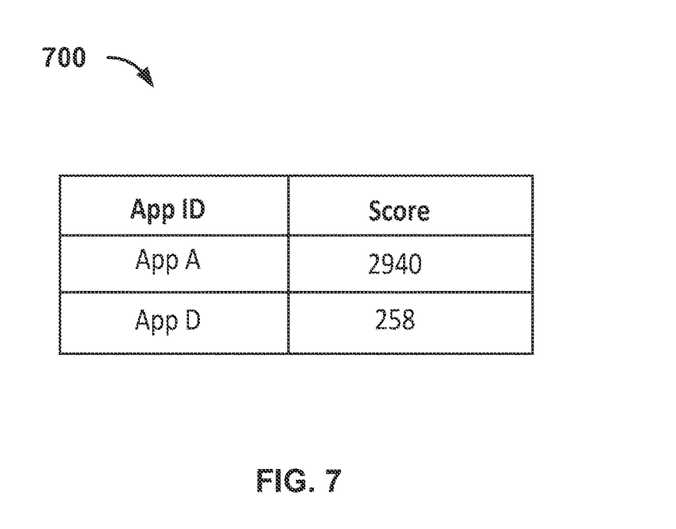
FIG. 7 shows an example of a scored list of applications in accordance with an implementation as described herein.

An example of constructing a scored list of applications for User 3 is shown in FIGS. 6 and 7, given the application signatures shown in FIG. 4 and the user similarity matrix shown in FIG. 5. The similarity values between User 3 and each of User 1 and User 2 are retrieved from similarity matrix 500, which are 0.04 and 0.89 respectively. Then, the difference between the application signature of User 3 and each of User 1 and User 2 are determined. The difference between application signatures may be calculated by treating each application signature as a vector and subtracting the vectors. This is illustrated in FIG. 6. Expressed as vectors, the application signature of User 1 is (1600, 900, 0, 6000), the application signature of User 2 is (3000, 1100, 5000, 0), and the application signature of User 3 is (0, 1300, 4000, 0). Table 602 is the application signature of User 3 subtracted from the application signature of User 1, which gives the vector (1600, −400, −4000, 6000). Likewise, table 604 is the application signature of User 3 subtracted from the application signature of User 2, which gives the vector (3000, −200, 1000, 0).

After the application signature differentials are determined between User 3 and the other users, a score is calculated for each application with a usage total of zero in the application signature of User 3. A usage total of zero indicates User 3 has never used the application. If the usage total of an application is non-zero, then User 3 has already used the application and so should not be recommended that application again. User 3's application signature 406 in FIG. 4 indicates that User 3 has used App B and App C but not App A or App D, so scores are calculated for App A and App D. The score may be calculated as the weighted average of the usage total differentials of the applications in tables 602 and 604, weighted by the similarity value between the users of the respective tables, and then divided by the sum of the similarity values. For example, the score for App A is (1600*0.04+300*0.89)/(0.04+0.89)=2940, as shown in FIG. 7. Likewise, the score for App D is (6000*0.04+0*0.89)/(0.04+0.89)=258. Generally, for the k-th user, the score for an application X that has a usage total of zero in the user's application signature may be expressed as:

$$(SV_{1,k}(UT_1-UT_k)+SV_{2,k}(UT_2-UT_k)+\ldots+SV_{N,k}(UT_N-UT_k))/(SV_{1,k}+SV_{2,k}+\ldots SV_{N,k}),$$

where N is the number of users of the cloud computing service, where n ranges from 1 to N and excludes the k-th user, $UT_n$ is the usage total of the first application for the n-th user, and $SV_{n,k}$ is the similarity value between the n-th user and the k-th user. However, other methods for calculating a score using the application signatures and user similarity matrix may be used. The scored list of applications may be stored as a table with the application IDs of each application not already used by the user, and its corresponding score. The list may be unsorted or may be sorted based on score, application ID, or some other sort basis. The scores may be normalized.

Figure 8:
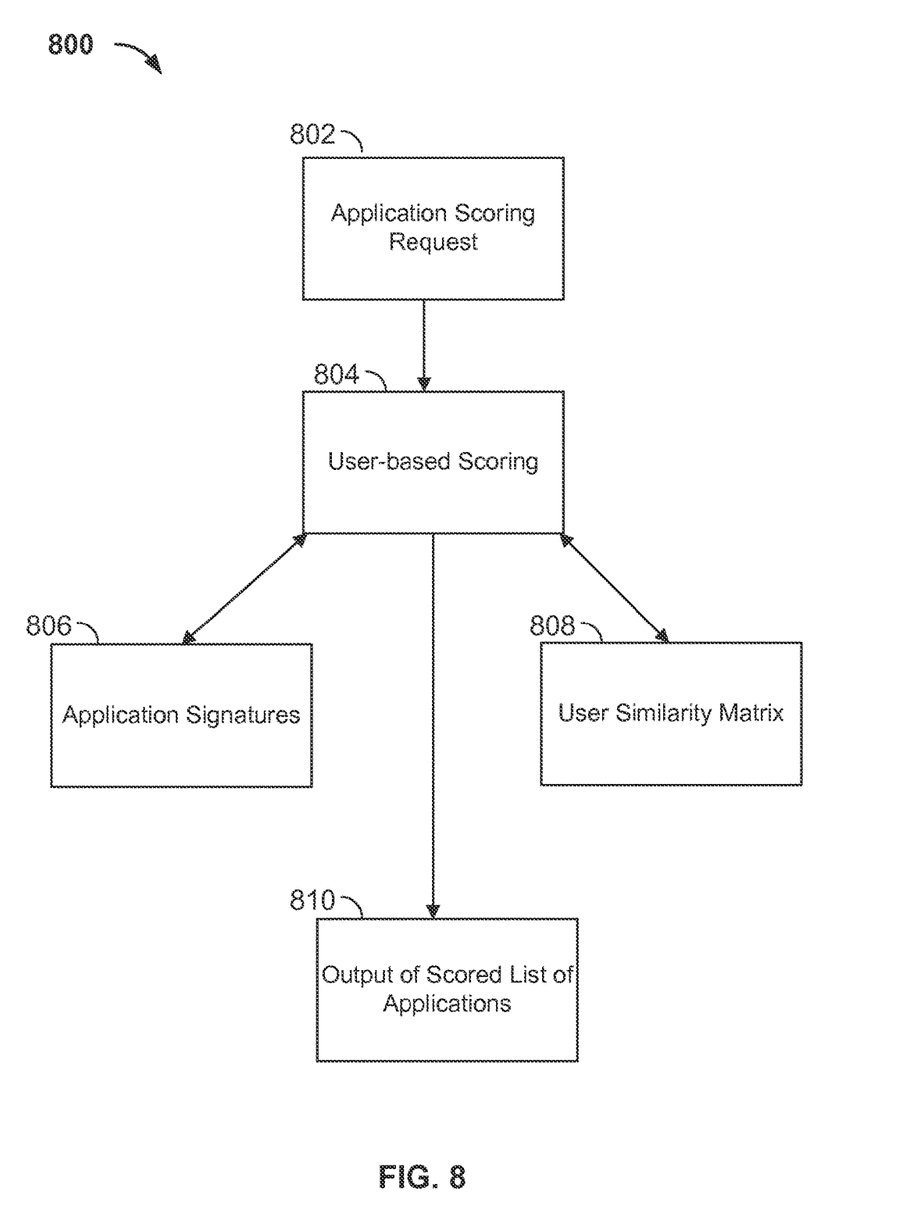
FIG. 8 shows a scorer unit for generating a scored list of applications in accordance with an implementation as described herein.

The cloud computing service has a scorer unit that utilizes the application signature and the user similarity matrix to create a scored list of applications for a user, where the score is a function of the usage totals for the application in the application signatures for each user and each other user's similarity value to the user. This list may be used by the cloud computing service to recommend one or more applications to a user. FIG. 8 shows an example flow chart 800 of a scorer unit operated by the cloud computing service. The scorer unit is part of the cloud computing service and executes flow chart 800 each time a request is received to score applications based on the application usage characteristics of the user body. The scorer unit is initiated when an application scoring request is received, shown at 802. The scoring request may be triggered by a user action on the cloud computing user interface. For example, the scoring request may be initiated when a user logs into the cloud computing service or when the user navigates to an application selection or application browsing screen. These actions provide opportunities for the cloud computing service to display recommended applications to a user.

Once the application scoring request is received, the scorer unit initiates a user-based scoring methodology, shown at 804. Two inputs are used to implement file type scoring: the application signatures 806 for each user of the cloud computing service and user similarity matrix 808. The application signatures 806 for each user store usage totals that measure how many times the user has used an application to open files accessible to the user. This information is obtained from the file metadata of each file stored on the cloud computing service, which stores application usage history data on a per user basis. User similarity matrix 808 stores similarity values for each pair of users of the cloud computing service, where the similarity value measures the similarity between the two users' application signatures. For example, the application signatures may be considered a vector and cosine similarity is used to generate the similarity value between two vectors. The cloud computing service creates, stores and periodically updates the application signatures 806 for each user and the user similarity matrix 808.

The scorer unit constructs a scored list of applications using application signatures 806 for each user and user similarity matrix 808. The scored list of applications does not include scores for applications that the user has already installed. The score is a function of the usage totals for the application in the application signatures for each user and each user's similarity value to the target user. For example, one formula for calculating the score of an application X for a given user k is:

$$(SV_{1,k}(UT_1-UT_k)+SV_{2,k}(UT_2-UT_k)+\ldots+SV_{N,k}(UT_N-UT_k))/(SV_{1,k}+SV_{2,k}+\ldots SV_{N,k}),$$

where N is the number of users of the cloud computing service, where n ranges from 1 to N and excludes the k-th user, $UT_n$ is the usage total of the first application for the n-th user, and $SV_{n,k}$ is the similarity value between the n-th user and the k-th user. The scored list of applications is then a table of application IDs and the score for each application. The scored list of applications is the output of the scorer unit, shown at 810. The scored list of applications may be sorted by score, by application ID, or by any other sorting basis, or may be unsorted. The score of each application may be normalized. The cloud computing service may use the outputted list to generate application recommendations for the user, or may combine the output of the scorer unit with other scoring methodologies to generate a composite scored list, which is then used to generate application recommendations for the user.

Figure 9:
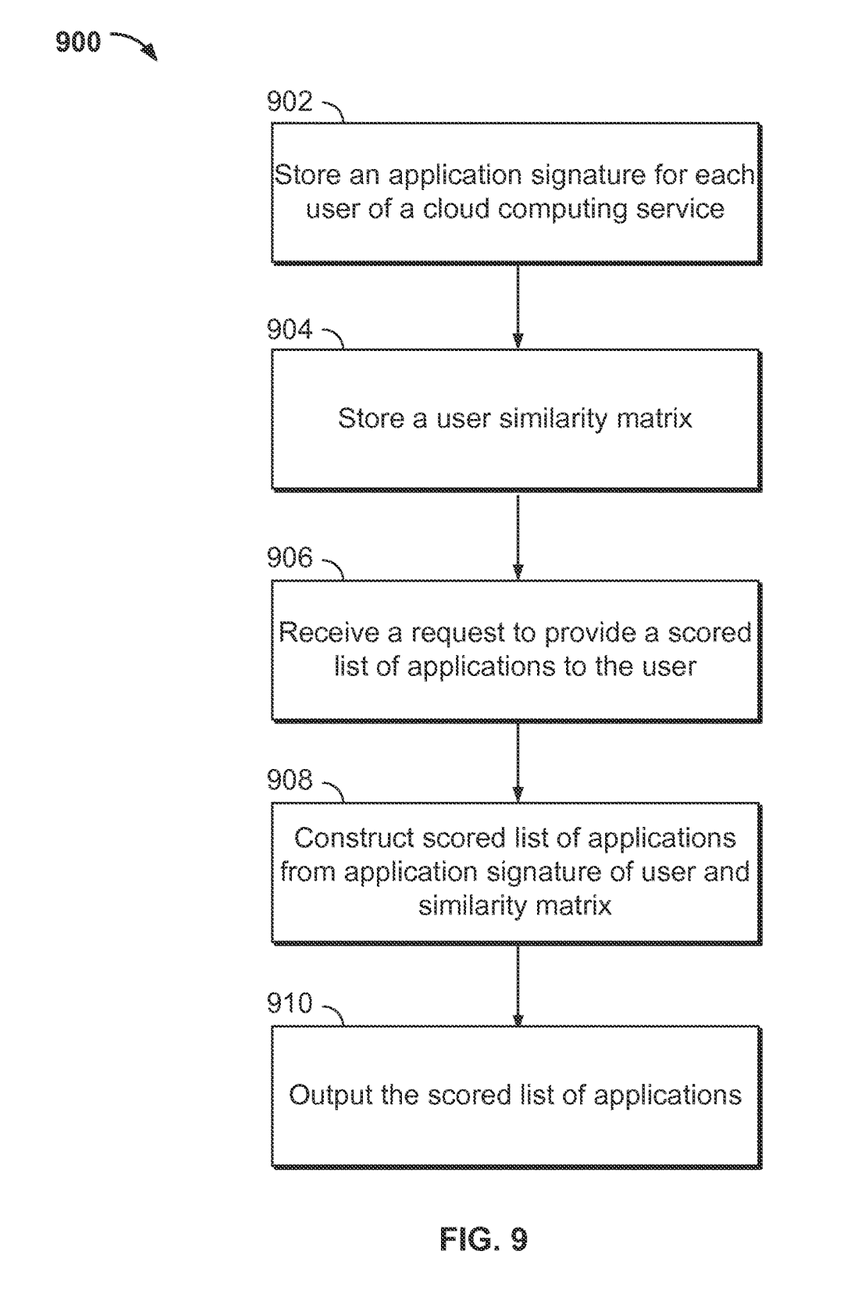
FIG. 9 shows a method for providing user-based recommendations for applications to a user in accordance with an implementation as described herein.

Methods for providing recommendations for applications to a user based on application usage characteristics are now described. Method 900 illustrated in FIG. 9 shows a method for providing a scored list of applications for use in recommending applications to a user, which includes storing an application signature for each user of a cloud computing service, where the application signature for a first user stores a usage total for the first user for each application in a set of available applications provided by the cloud computing service. The method further includes storing a user similarity matrix across all users of the cloud computing service, where a first similarity value in the user similarity matrix measures the similarity between the first user's application signature and a second user's application signature. The method further includes receiving at the cloud computing service a request to provide a scored list of applications for the first user, constructing the scored list of applications from the set of available applications, where a score of each application is a function of the usage totals for the application in the application signatures for each user and each user's similarity value to the first user, and outputting the scored list of applications. Method 900 may be performed on one or more servers that provide a cloud computing service, such as cloud computing service 102 in FIG. 1 or cloud computing service 202 in FIG. 2. Specifically, a scorer unit within the cloud computing service, such as shown in FIG. 8, may perform all or a portion of method 900.

Method 900 begins when the cloud computing service creates and stores an application signature for each user of the cloud computing service, shown at 902. The application signature of a user stores usage totals for each application in a set of available applications provided by the cloud computing service. The usage total represents the number of times the user has used the application to open files stored on the cloud computing service. The usage total is obtained from the file metadata of each file. The file metadata contains application usage history data, which stores the number of times each application has been used to open the file, on a per user basis. The usage total for a given application and a given user may be the sum of the number of times the user has used the application to open each file stored on the cloud computing service, as obtained from the application usage history data of each file. The application signature for a user may be a table that stores the application ID of each application and its corresponding usage total. The application signatures may be updated or recalculated on a periodic basis to account for recent user activity.

After the application signatures are created and stored, the cloud computing service creates and stores a user similarity matrix, shown at 904. The user similarity matrix stores similarity values for each pair of users of the cloud computing service. The similarity values measure the similarity between the application signatures of pairs of users. The user similarity matrix has rows and columns corresponding to each user of the cloud computing service. The similarity value of a cell of the matrix is the similarity between the application signature of the row user and the application signature of the column user. There are a number of ways to measure the similarity between application signatures. One method is to use cosine similarity. The application signatures may be treated as vectors. The cosine similarity value between two vectors X and Y is expressed as $\cos(\theta)=X\bullet Y/\|X\|\|Y\|$, where $X\bullet Y$ is the dot product of vectors X and Y, $\|X\|$ is the magnitude of vector X, and $\|Y\|$ is the magnitude of vector Y. The cloud computing service calculates the similarity value for each pairwise combination of users and stores the values in the user similarity matrix. The user similarity matrix may be updated or recalculated on a periodic basis to account for recent user activity.

After the user similarity matrix is created and stored, the cloud computing service receives a request to provide a scored list of applications to a user, shown at 906. The scored list of applications may be used to generate a set of recommended applications to show the user. The request may be triggered by certain user actions on the user interface provided by the cloud computing service. For example, the request may be triggered when the user logs into the cloud computing service on the user's client computer, or when the user navigates to an application selection or application browsing page on the user interface. The request may include an instruction to use a user-based scoring method, or the default scoring method may be set to user-based scoring.

After receiving the request, the cloud computing service constructs a scored list of applications, shown at 908. The score of each application is a function of the usage totals for the application in the application signatures for each user and each user's similarity value to the target user. For example, one formula for calculating the score of an application X for a given user k is:

$$(SV_{1,k}(UT_1-UT_k)+SV_{2,k}(UT_2-UT_k)+\ldots+SV_{N,k}(UT_N-UT_k))/(SV_{1,k}+SV_{2,k}+\ldots SV_{N,k}),$$

where N is the number of users of the cloud computing service, where n ranges from 1 to N and excludes the k-th user, $UT_n$ is the usage total of the first application for the n-th user, and $SV_{n,k}$ is the similarity value between the n-th user and the k-th user. There may be other ways to calculate the score using the usage totals of the application and the user similarity matrix. The scored list of applications may be a table with the application ID of each application and the corresponding score. The scored list of applications may be normalized, and may be unsorted or sorted by score, application ID, or some other sorting basis. The scored list of applications is then outputted, shown at 910. The outputted list, either alone or combined with other scoring methods, may be used by the cloud computing service to recommend one or more applications to the user. In this manner, a cloud computing service provides a scored list of applications for use in recommending applications to a user.

It will be apparent that aspects of the systems and methods described herein may be implemented in many different forms of software, firmware, and hardware in the implementations illustrated in the drawings. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method for providing a scored list of applications for use in recommending applications to a user, the method comprising:
    storing an application signature for each user of a cloud computing service, wherein the application signature of a first user stores a usage total for the first user for each application in a set of available applications provided by the cloud computing service, wherein the usage total is a total number of times the first user has used a respective application to open a file in a set of files on the cloud computing service;
    storing a user similarity matrix across all users of the cloud computing service, wherein a first similarity value in the user similarity matrix measures the similarity between the first user's application signature and a second user's application signature, and wherein the cloud computing service periodically updates the application signature for each user based on user activity on the cloud computing service;
    receiving at the cloud computing service a request to provide a scored list of applications for the first user;
    constructing the scored list of applications from the set of available applications, wherein a score of each application is a function of the usage totals for the application in the application signatures for each user and each user's similarity value to the first user;
    outputting the scored list of applications;
    periodically updating the user similarity matrix, wherein the user similarity matrix is indexed by a user ID of each user in a row dimension and in a column dimension of the user similarity matrix and the user similarity matrix includes a triangular matrix; and
    updating, in response to user activity of the first user, a row or a column of the triangular matrix corresponding to the user ID of the first user.

2. The method of claim 1, wherein the scored list of applications is sorted by the score of each application and displayed to the first user on a user interface provided to the first user by the cloud computing service.

3. The method of claim 1, wherein each application in the scored list of applications is identified by an application ID, and the scored list of applications includes at least one application not previously used by the user.

4. The method of claim 1, wherein the request to provide the scored list of applications is triggered by a user action on a user interface provided to the user by the cloud computing service, and the scored list of applications is used to generate application recommendations that are displayed to the user over the user interface.

5. The method of claim 1, wherein the application signature for the first user stores a first usage total for a first application in the set of available applications, wherein the file is stored on the cloud computing service and the application signatures for the first user and the second user are vectors of the same dimension.

6. The method of claim 5, wherein the first usage total is obtained from file metadata of each file stored on the cloud computing service; and the file metadata is periodically updated based on user activity on the cloud computing service.

7. The method of claim 6, wherein the file metadata of each file stores, for each user, non-zero values for the number of times the user has used each application in the set of available applications to open the file.

8. The method of claim 1, wherein the first similarity value is the cosine similarity value between the first user's application signature and the second user's application signature.

9. The method of claim 1, wherein for a k-th user the score for a first application in the set of available applications is calculated as:

$$(SV_{1,k}(UT_1-UT_k)+SV_{2,k}(UT_2-UT_k)+ \ldots +SV_{N,k}(UT_N-UT_k))/(SV_{1,k}+SV_{2,k}+ \ldots SV_{N,k}), \text{ where}$$

N is the number of users of the cloud computing service, where n ranges from 1 to N and excludes the k-th user, $UT_n$ is the usage total of the first application for the n-th user, and $SV_{n,k}$ is the similarity value between the n-th user and the k-th user.

10. The method of claim 9, wherein the usage total of the first application for the n-th user is obtained from the application signature of the n-th user.

11. The method of claim 1, wherein the scored list of applications excludes applications that the first user has already used.

12. An apparatus for providing a scored list of applications for use in recommending applications to a user, the apparatus comprising:
    a server configured to:
        communicate with a plurality of client computers;
        store an application signature for each user of the server, wherein the application signature for a first user stores a usage total for the first user for each application in a set of available applications provided by the server, wherein the usage total is a total number of times the first user has used a respective application to open a file set of files on the cloud computing service;

store a user similarity matrix across all users of the server, wherein a first similarity value in the user similarity matrix measures the similarity between the first user's application signature and a second user's application signature, and wherein the cloud computing service periodically updates the application signature for each user based on user activity on the cloud computing service;

receive from a first client computer in the plurality of client computers a request to provide a scored list of applications for the first user;

construct the scored list of applications from the set of available applications, wherein a score of each application is a function of the usage totals for the application in the application signatures for each user and each user's similarity value to the first user;

output the scored list of applications;

periodically update the user similarity matrix, wherein the user similarity matrix is indexed by a user ID of each user in a row dimension and in a column dimension of the user similarity matrix and the user similarity matrix includes a triangular matrix; and update, in response to user activity of the first user, a row or a column of the triangular matrix corresponding to the user ID of the first user.

13. The apparatus of claim 12, wherein the server is further configured to sort the scored list of applications by the score of each application and display the sorted scored list of applications to the first user on a user interface provided to the first user by the cloud computing service.

14. The apparatus of claim 12, wherein each application in the scored list of applications is identified by an application ID, and the scored list of applications includes at least one application not previously used by the user.

15. The apparatus of claim 12, wherein the request to provide the scored list of applications is triggered by a user action on a user interface provided to the user by the server, and the scored list of applications is used to generate application recommendations that are displayed to the user over the user interface.

16. The apparatus of claim 12, wherein the application signature for the first user stores a first usage total for a first application in the set of available applications, wherein the file is stored on the server and the application signatures for the first user and the second user are vectors of the same dimension.

17. The apparatus of claim 16, wherein the first usage total is obtained from file metadata of each file stored on the server; and the file metadata is periodically updated based on user activity on the cloud computing service.

18. The apparatus of claim 17, wherein the file metadata of each file stores, for each user, non-zero values for the number of times the user has used each application in the set of available applications to open the file.

19. The apparatus of claim 12, wherein the first similarity value is the cosine similarity value between the first user's application signature and the second user's application signature.

20. The apparatus of claim 12, wherein for a k-th user the score for a first application in the set of available applications is calculated as:

$$(SV_{1,k}(UT_1-UT_k)+SV_{2,k}(UT_2-UT_k)+ \ldots +SV_{N,k}(UT_N-UT_k))/(SV_{1,k}+SV_{2,k}+ \ldots SV_{N,k}), \text{ where}$$

N is the number of users of the cloud computing service, where n ranges from 1 to N and excludes the k-th user, $UT_n$ is the usage total of the first application for the n-th user, and $SV_{N,k}$ is the similarity value between the n-th user and the k-th user.

21. The apparatus of claim 20, wherein the usage total of the first application for the n-th user is obtained from the application signature of the n-th user.

22. The apparatus of claim 12, wherein the scored list of applications excludes applications that the first user has already used.

23. A non-transitory computer readable medium storing computer-executable instructions, which, when executed by a processor, cause the processor to carry out a method for providing a scored list of applications for use in recommending applications to a user, wherein the instructions comprise:

instructions to store an application signature for each user of a cloud computing service, wherein the application signature for a first user stores a usage total for the first user for each application in a set of available applications provided by the cloud computing service, wherein the usage total is a total number of times the first user has used a respective application to open a file set of files on the cloud computing service;

instructions to store a user similarity matrix across all users of the cloud computing service, wherein a first similarity value in the user similarity matrix measures the similarity between the first user's application signature and a second user's application signature, and wherein the cloud computing service periodically updates the application signature for each user based on user activity on the cloud computing service;

instructions to receive at the cloud computing service a request to provide a scored list of applications for the first user;

instructions to construct the scored list of applications from the set of available applications, wherein a score of each application is a function of the usage totals for the application in the application signatures for each user and each user's similarity value to the first user;

instructions to output the scored list of applications;

instructions to periodically update the user similarity matrix, wherein the user similarity matrix is indexed by a user ID of each user in a row dimension and in a column dimension of the user similarity matrix and the user similarity matrix includes a triangular matrix; and instructions to update, in response to user activity of the first user, a row or a column of the triangular matrix corresponding to the user ID of the first user.

24. The non-transitory computer readable medium of claim 23, wherein the application signature for the first user stores a first usage total for a first application in the set of available applications, wherein the file is stored on the cloud computing service and the application signatures for the first user and the second user are vectors of the same dimension.

25. The non-transitory computer readable medium of claim 24, wherein the first usage total is obtained from file metadata of each file stored on the cloud computing service; and the file metadata is periodically updated based on user activity on the cloud computing service.

26. The non-transitory computer readable medium of claim 25, wherein the file metadata of each file stores, for each user, non-zero values for the number of times the user has used each application in the set of available applications to open the file.

27. The non-transitory computer readable medium of claim 23, wherein the first similarity value is the cosine similarity between the first user's application signature and the second user's application signature.

28. The non-transitory computer readable medium of claim 23, wherein for a k-th user the score for a first application in the set of available applications is calculated as:

$$(SV_{1,k}(UT_1-UT_k)+SV_{2,k}(UT_2-UT_k)+ \ldots +SV_{N,k}(UT_N-UT_k))/(SV_{1,k}+SV_{2,k}+ \ldots SV_{N,k}), \text{ where}$$

N is the number of users of the cloud computing service, where n ranges from 1 to N and excludes the k-th user, $UT_n$ is the usage total of the first application for the n-th user, and $SV_{N,k}$ is the similarity value between the n-th user and the k-th user.

29. The non-transitory computer readable medium of claim 28, wherein the usage total of the first application for the n-th user is obtained from the application signature of the n-th user.

30. A system for providing a scored list of applications for use in recommending applications to a user, the system comprising:
   a plurality of client computers; and
   a server, wherein the server is configured to:
      communicate with the plurality of client computers;
      store an application signature for each user of the server, wherein the application signature for a first user stores a usage total for the first user for each application in a set of available applications provided by the server, wherein the usage total is a total number of times the first user has used a respective application to open a file in a set of files on the cloud computing service;
      store a user similarity matrix across all users of the server, wherein a first similarity value in the user similarity matrix measures the similarity between the first user's application signature and a second user's application signature, and wherein the cloud computing service periodically updates the application signature for each user based on user activity on the cloud computing service;
      receive from a first client computer in the plurality of client computers a request to provide a scored list of applications for the first user;
      construct the scored list of applications from the set of available applications, wherein a score of each application is a function of the usage totals for the application in the application signatures for each user and each user's similarity value to the first user;
      output the scored list of applications;
      periodically update the user similarity matrix, wherein the user similarity matrix is indexed by a user ID of each user in a row dimension and in a column dimension of the user similarity matrix and the user similarity matrix includes a triangular matrix; and
      update, in response to user activity of the first user, a row or a column of the triangular matrix corresponding to the user ID of the first user.

31. The method of claim 1, wherein the total number of times the first user has used the respective application to open the file in the set of files on the cloud computing service includes:
   a first total number of times the first user has used the respective application to open the file on the cloud computing service using a first device; and
   a second total number of times the first user has used the respective application to open the file on the cloud computing service using a second device, wherein the first device and the second device are in communication with the cloud computing service.

32. The apparatus of claim 12, wherein the total number of times the first user has used the respective application to open the file in the set of files on the cloud computing service includes:
   a first total number of times the first user has used the respective application to open the file on the cloud computing service using a first device; and
   a second total number of times the first user has used the respective application to open the file on the cloud computing service using a second device, wherein the first device and the second device are in communication with the cloud computing service.

* * * * *